United States Patent [19]
Tanaka

[11] Patent Number: 5,900,462
[45] Date of Patent: May 4, 1999

[54] CURABLE RESIN COMPOSITION

[75] Inventor: Hozumi Tanaka, Tokyo, Japan

[73] Assignee: Toyo Ink Manufacturing Co., Ltd., Tokyo, Japan

[21] Appl. No.: 08/748,616

[22] Filed: Nov. 13, 1996

[30] Foreign Application Priority Data

Nov. 20, 1995 [JP] Japan ..................... 7-300851
Nov. 20, 1995 [JP] Japan ..................... 7-300852

[51] Int. Cl.$^6$ ..................................... C08G 63/48
[52] U.S. Cl. ................. 525/54.21; 524/803; 524/818; 525/63; 525/64; 525/218; 525/231; 525/300; 525/328.6; 525/79; 525/493; 525/118; 525/153; 525/159; 525/162
[58] Field of Search .................. 525/54.21, 63, 525/64, 218, 231, 300, 328.6, 493, 79, 118, 153, 159, 162; 524/803, 818

[56] References Cited

U.S. PATENT DOCUMENTS 5,500,246  3/1996  Morizono et al. ................. 525/108

*Primary Examiner*—Melvyn I. Marquis
*Attorney, Agent, or Firm*—Wenderoth, Lind & Ponack, L.L.P.

[57] ABSTRACT

A curable resin composition comprises a compound containing a primary hydroxyl group and a compound containing a ketone group, in which the compound containing the ketone group is a compound in which at least one of the carbon atoms adjacent to the carbonyl carbon bonds to a hydrogen atom, and the curable resin composition can give a cured product having a high crosslink density by means of a dehydrating reaction between the primary hydroxyl group and the ketone group and the subsequent crosslinking of a vinyl bond formed by the dehydrating reaction.

20 Claims, No Drawings

CURABLE RESIN COMPOSITION

FIELD OF THE INVENTION

The present invention relates to a curable resin composition which is cured on the basis of a dehydrating reaction between a primary hydroxyl group and a ketone group. More specifically, it relates to a curable resin composition which can be used as a coating-forming material or an adhesive such as a coating composition or an ink.

PRIOR ART OF THE INVENTION

A radical reaction of a compound having an active double bond such as an acryl monomer or a reaction of an epoxy resin in the presence of an acid anhydride or a diamine is known as a curing reaction. When an active acryl group is introduced into a polymer, there is employed a method in which a polymer having a hydroxyl group is synthesized and then reacted with an acryl monomer having a functional group which is reactive with the hydroxyl group. The problem of this method is that it is required to remove an unreacted monomer and that the modified polymer as an end product is poor in shelf life. Further, when a polymer having an epoxy group is stored as a mixture with an acid anhydride or a diamine, the problem is that the mixture undergoes a curing reaction to cause a gel-forming reaction even if stored at a temperature of not more than 0° C.

There is known a method in which a ketone-group-containing polymer is cured by reacting it with a hydrazine compound (JP-B-61-6861). Since, however, the hydrazine compound is generally insoluble in water, it is required to employ a special technique for converting this composition (containing a ketone-group-containing polymer and a hydrazine compound) to a water-based composition. Further, JP-A-51-101952 discloses that a vinyl ether compound can obtained from cyclohexanone and an alcohol. In this case, however, a solvent such as toluene is used and it is required to heat the cyclohexanone and the alcohol to form an azeotropic mixture and remove formed water from the system.

SUMMARY OF THE INVENTION

It is an object of the present invention to provide a curable resin composition or a self-crosslinkable polymer which can give a cured product having a high crosslink density by means of a dehydrating reaction between a primary hydroxyl group and a ketone group and the subsequent crosslinking of a vinyl bond formed by the dehydrating reaction.

It is another object of the present invention to provide a curable resin composition or a self-crosslinkable polymer which is excellent in shelf life, environmentally safe and usable with an organic solvent or water.

According to the present invention, there is provided a curable resin composition comprising a compound containing a primary hydroxyl group and a compound containing a ketone group, the compound containing the ketone group being a compound in which at least one of the carbon atoms adjacent to the carbonyl carbon bonds to a hydrogen atom.

Further, according to the present invention, there is provided a self-crosslinkable polymer obtained by copolymerizing a vinyl monomer containing a primary hydroxyl group and a vinyl monomer containing a ketone group, the vinyl monomer containing the ketone group being a monomer in which at least one of the carbon atoms adjacent to the carbonyl carbon bonds to a hydrogen atom.

DETAILED DESCRIPTION OF THE INVENTION

In the present invention, the dehydrating reaction between the primary hydroxyl group and the ketone group is shown by the following reaction scheme.

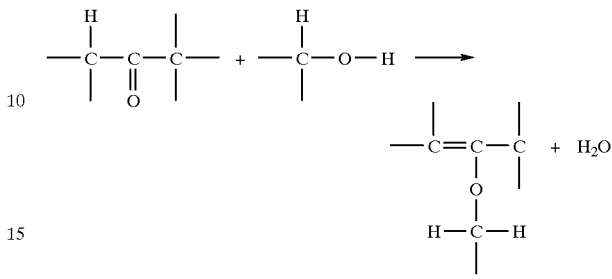

In the present invention, the compound containing a primary hydroxyl group includes a polymer compound containing a primary hydroxyl group, obtained by the vinyl-polymerization of a vinyl monomer containing a primary hydroxyl group, and a polymer compound containing a primary hydroxyl group, obtained by the polymerization of a vinyl monomer containing a primary hydroxyl group and other vinyl monomer (which does not contain such a hydroyl group). Examples of the vinyl monomer containing a primary hydroxyl group include acrylate monomers containing a primary hydroxyl group, acrylamide monomers containing a primary hydroxyl group and (poly)olefin monomers containing a primary hydroxyl group.

Examples of the acrylate monomers containing a primary hydroxyl group include ethylene glycol (meth)acrylate, 4-hydroxybutyl (meth)acrylate, 3-hydroxypropyl (meth)acrylate, tetraethylene glycol (meth)acrylate, tetrapropylene glycol (meth)acrylate and polyethylene glycol (meth)acrylate. Examples of the acrylamide monomers containing a primary hydroxyl group include N-(hydroxymethyl) meth)acrylamide, N-(hydroxyethyl)(meth)-acrylamide and diacetoneacrylamide. Examples of the olefin monomers containing a primary hydroxyl group include allyl alcohol, 4-hydroxy-1-butene, 4-hydroxymethylstyrene, 4-hydroxyethylstyrene and 1,4-dihydroxy-2-butene.

As described above, the compound containing a primary hydroxyl group may be a polymer compound containing a primary hydroxyl group, obtained by the polymerization of the vinyl monomer containing a primary hydroxyl group and other vinyl monomer containing no primary hydroxyl group. Examples of the monomer containing no primary hydroxyl group include styrene, methyl (meth)acrylate, (meth)acrylic acid, vinyl acetate, ethylene, propylene, vinyl chloride, acrylonitrile, vinyl pyrrolidone, butadiene and isoprene.

The polymer compound containing a primary hydroxy group refers to a polymer compound having a weight average molecular weight of at least 500, preferably at least 1,000. For accelerating the curing reaction, the polymer compound preferably has a molecule containing at least two hydroxyl groups.

Further, the polymer compound containing a primary hydroxyl group may be a polyhydric alcohol or may be a natural polymer.

Examples of the polyhydric alcohol containing a primary hydroxyl group include polyethylene glycol, polypropylene oxide, polytetrahydrofuran and polybutadienediol.

Examples of the natural polymer include cellulose and chitin. The natural polymer may be a modified natural polymer. Examples of the modified natural polymer include chitosan, cyclic polysaccharide, and modified celluose such as cellulose acetate, hydroxypropyl cellulose, hydroxymethyl cellulose and hydroxyethyl cellulose.

In the present invention, the compound containing a primary hydroxyl group may be selected from monohydric or polyhydric low-molecular-weight compounds containing hydroxy group. Examples of the monohydric low-molecular-weight compounds include methanol, ethanol, propanol, butanol, hexanol, octanol, tridecyl alcohol, isoamyl alcohol, trimethylol propane, lauryl alcohol, nonyl alcohol, neopentyl alcohol, 4-hydroxy-2-butanone, 3-methyl-3-methoxybutanol, furyl alcohol, tetrahydrofuryl alcohol, ethanolamine and hydroxyethylpiperazine. Examples of the polyhydric compounds include alcohols having 2 to 6 hydroxyl groups such as pentaerythritol, ethylene glycol, propylene glycol, 2-butyl-1-ethyl-1,3-propanediol, butanediol, 1,3-butanediol, trimethylol ethane, octanediol, diethylene glycol, triethylene glycol, allyl alcohol, 3-methyl-1,5-pentanediol, N-methyl-N,N-diethanolamine, N,N-diethylethanolamine, tris(2-hydroxyethyl)isocyanurate, hexamethylol melamine and hexaethylol melamine. The above compounds may be used alone or in combination.

In the present invention, the compound containing a ketone group is preferably a polymer compound containing a ketone group. This polymer compound has at least one ketone group containing two carbon atoms adjacent to its carbonyl carbon in its main chain, a side chain or each of these chains (provided that at least one hydrogen atom bonds to at least one of the two carbon atoms adjacent to the carbonyl carbon), and which has a weight average molecular weight of at least 500, preferably at least 1,000. For accelerating the curing reaction, the polymer compound preferably contains at least two ketone groups which are as defined above.

The polymer compound containing a ketone group, used in the present invention, can be obtained by the vinyl-polymerization of a vinyl monomer containing a ketone group and having an active double bond. Examples of the vinyl monomer containing a ketone group and having an active double bond include (meth)acryloyl alkyl ketone compounds such as 4-(meth)acryloyl-2-butanone, 3-(meth)acryloyl-2-butanone, 2-(meth)acryloyl-3-methyl-2-butanone, 5-(meth)acryloyl-2-pentanone, 4-(meth)acryloyl-4-methyl-2-pentanone, diethyl methacryloyldiacetylmethane acryloylmalonate and acryloylacetylacetone, vinyl alkyl ketone compounds such as vinyl methyl ketone, vinyl ethyl ketone, vinyl isobutyl ketone, hydroxymethyl vinyl ketone, tert-butyl vinyl ketone, neopentyl vinyl ketone, α-chlorovinyl methyl ketone and mesityl oxide, acetoacetoxyalkyl (meth)acrylates such as acetoacetoxyethyl (meth)acrylate, diacetoneacrylamide, and benzalacetone.

Further, the polymer compound containing a ketone group, used in the present invention, includes a copolymer obtained by copolymerizing at least two of the above vinyl monomers, or a copolymer obtained by copolymerizing at least one of the above vinyl monomers and other vinyl monomer. Examples of the above "other" vinyl monomer include styrene, methyl (meth)acrylate, (meth)acrylic acid, vinyl acetate, ethylene, propylene, vinyl chloride, acrylonitrile, vinylpyrrolidone, vinylpyridine, butadiene, isoprene and butyl vinyl ether. In the copolymer obtained by copolymerizing at least one of the above vinyl monomers and other vinyl monomer, the copolymer contains at least one ketone group. For completely proceeding with the curing reaction, however, the copolymer preferably contains at least two ketone groups.

Further, as a polymer compound containing a ketone group, there may be used a copolymer obtained from carbon monoxide and a vinyl monomer, such as a copolymer formed from ethylene and carbon monoxide.

The polymer compound containing a ketone group, used in the present invention, excludes a compound containing an ester bond or a carboxyl group alone. However, there may be used a polyester resin, a polyamide resin, a polyimide resin, a polyether resin, a polyurethane resin, a polyethylene resin, a polycarbonate resin or a polysulfone resin so long as these resins are allowed to contain a ketone group (in which at least one hydrogen atom bonds to at least one of the carbon atoms adjacent to the carbonyl carbon). This polymer compound containing a ketone group can obtained by the graft-polymerization of the above polymer compound (resin) and a vinyl monomer containing a ketone group.

The polymer containing a ketone group, used in the present invention, can be prepared by general radical polymerization in a solution.

The curable resin composition of the present invention may contain the polymer compound containing a ketone group and the compound containing a primary hydroxyl group in any amount ratio. The compound containing a ketone group may be a compound containing at least one ketone group, and the compound containing a primary hydroxyl group may be a compound containing at least one primary hydroxyl group. For accelerating the curing reaction, the compound containing a ketone group preferably contains at least two ketone groups, and the compound containing a primary hydroxyl group preferably contains at least two primary hydroxyl groups.

The self-crosslinkable polymer (copolymer) containing a primary hydroxyl group and a ketone group, provided by the present invention, can be obtained by the copolymerization of a vinyl monomer containing a primary hydroxyl group and a vinyl monomer containing a ketone group (provided that at least one hydrogen atom bonds to at least one carbon atom adjacent to the carbonyl carbon).

The vinyl monomer containing a primary hydroxyl group, used in the above copolymerization, can be selected from the above-described vinyl monomers containing a primary hydroxyl group. Examples of the vinyl monomers include acrylate monomers, acrylamide monomers and olefin monomers. The vinyl monomer containing a ketone group can be selected from the above-described vinyl monomers containing a ketone group in their side chains and having an active double bond. In the synthesis of the above self-crosslinkable copolymer, the above-described "other" vinyl monomers may be also used.

The self-crosslinkable copolymer contains at least one component (repeating unit), preferably at least two components (repeating units), from the vinyl monomer containing a primary hydroxyl group and at least one component, preferably at least two components, from the vinyl monomer containing a ketone group. The self-crosslinkable polymer (copolymer) can be obtained by the copolymerization of the vinyl monomer containing a primary hydroxyl group and the vinyl monomer containing a ketone group in any amount ratio, such as 1 to 99 mol of the vinyl monomer containing a primary hydroxyl group and 99 to 1 mol of the vinyl monomer containing a ketone group. The self-crosslinkable polymer has a weight average molecular weight of at least 500, preferably at least 1,000 for accelerating the curing reaction.

In the present invention, the copolymerization can be carried out by any one of radical, anion and cation vinyl polymerization methods. The copolymer can be easily obtained by radical polymerization in the presence of a solvent, and it can be also obtained by mass polymerization in the absence of a solvent. Further, the copolymer can be obtained by water-based suspension polymerization or emulsion polymerization.

The solvent used for the above polymerization or for dissolving the curable resin composition includes ethyl acetate, toluene, xylene, benzene, dioxane, tetrahydrofuran, methyl cellosolve acetate, dimethylformamide, dimethylacetamide, dimethyl sulfoxide and sulfolane. Some of the already described compounds containing a hydroxyl group may be used as a solvent, such as n-butanol, methyl cellosolve, butyl cellosolve, diacetone alcohol and ethylene glycol. Further, water may be used as a solvent.

For improving the shelf life of the curable resin composition or the self-crosslinkable polymer of the present invention (these two end products will be sometimes simply referred to as "curable resin composition" hereinafter), it is effective to incorporate water into a solvent. A copolymer obtained by suspension-polymerizing or emulsion-polymerizing the the vinyl monomer containing a primary hydroxyl group and the vinyl monomer containing a ketone group can be used as a curable resin composition of the present invention.

When water is used as a solvent, or when the solvent contains water, the water works as an inhibitor to inhibit the dehydrating reaction between a primary hydroxyl group and a ketone group. Therefore, when the curable resin composition or the self-crosslinkable polymer of the present invention is present in an aqueous medium, they are improved in shelf life.

The curable resin composition of the present invention undergoes a curing reaction under heat without a catalyst, while it is preferred to incorporate a dehydrating catalyst. The amount of the catalyst based on the resin content is 0.01 to 80% by weight, preferably 0.01 to 10% by weight.

The dehydrating catalyst is selected from acidic catalysts, basic catalysts, or inorganic salt catalysts. Examples of the acidic catalysts include inorganic acids such as hydrochloric acid, bromic acid, iodic acid, fluoric acid, sulfuric acid, phosphoric acid, boric acid and boron fluoride, organic acids such as acetic acid, propionic acid, benzoic acid, trifluoroacetic acid and p-toluenesulfonic acid, and acidic organic compounds such as phenol. Further, a polymer compound having a carboxyl group, a sulfonyl group or a phosphoric acid group, such as polyacrylic acid or polystyrenesulfonic acid may be used. There may be used a complex with an organic substance, which works as Lewis acid, such as onium salt and pyrylium salt.

Examples of the basic catalyst include amine compounds such as pyridine, pyrrolidine, piperidine and triethylamine, metal hydroxides such as sodium hydroxide, potassium hydroxide, barium hydroxide and calcium hydroxide, metal alcolates such as sodium methoxide, potassium methoxide, lithium ethylate and potassium-t-butoxide, sodium carbonate, potassium carbonate, Grignard reagents and metal chelate compounds.

Examples of the inorganic salts include sulfuric acid salt, phosphoric acid salt, boric acid salt and hydrochloric acid salt. Examples of the organic salts include those salts obtained by a neutralizing reaction between the carboxyl group of acetic acid, etc., and an alkaline compound. Further, a dehydrating agent such as a molecular sieve or anhydrous calcium chloride may be used, and other catalyst may be used in combination.

The curable resin composition containing a photopolymerization initiator, provided by the present invention, undergoes a curing reaction when irradiated with light. After the irradiation with light, however, it is preferred to treat the curable resin composition under heat. The amount of the catalyst based on the resin content is 0.01 to 80% by weight, preferably 0.01 to 10% by weight.

The photopolymerization initiator may be that which releases Lewis acid or an inorganic or organic acid when irradiated with light. The photopolymerization initiator is grouped into an ultraviolet initiator and a visible light initiator. The ultraviolet initiator includes onium salt, (thia) pyrylium salt and a combination of any one of these and an ultraviolet sensitizer. The onium salt or the pyrylium salt includes salts of an onium or pyrylium compound and a halogen, $BF_4$, $BF_6$, $AsF_6$, $ClO_4$, $SbF_6$, $CF_3SO_3$, $CH_3SO_3$ or $CH_3C_6H_4SO_3$. Specific examples of the onium salt include 2,4,6-triazine compouds such as tris(trichloromethyl)-2,4,6-triazine, described in British Patent 1,388,492 and JP-A-53-133428, diallyliodonium salt derivatives such as iron allene complex, diphenyliodonium hexafluorophosphate and di(p-tolyl)iodonium hexafluoroantimonate, sulfonium salt derivatives such as triphenylsulfonium hexafluorophosphate and diphenylphenacylsulfonium hexafluorophosphate, and sulfonium organic boron complexes such as tetraphenyloxosulfonium (n-butyl)triphenylborate, described in JP-A-1-54440, European Patent 109851, European Patent 126712 and Journal of Imaging Science Vol. 30, page 170 (1986).

Examples of the pyrylium salt as (thia)pyrylium salt include pyrylium salt derivatives such as 2,4,6-triphenylpyrylium, 2,4,6-tris(4-methoxyphenyl)pyrylium and 2,4,6-trimethylphenylpyrylium. Examples of the thiapyrylium salt include thiapyrylium derivatives such as 2,4,6-triphenylthiapyrylium salt, 2,4,6-tris(4-methylphenyl) thiapyrylium and 2,4,6-phenylthiapyrylium. Although not specifically limited, specific examples of the (thia)pyrylium salt include chlorine derivatives, bromine derivatives, iodine derivatives, fluorine derivatives, fluoroborate derivatives, perchlorate derivatives, fluoroantimonate derivatives, fluorophosphonate derivatives and fluoroarsenate derivatives of pyrylium and thiapyrylium, and those compounds described in "Chem. Ber. pages 2309–2320 (1959) and Journal of Organic Chemistry, Vol. 36, pages 600–602 (1971). Further, a mixture containing an onium salt and a (thia)pyrylium salt in any amount ratio may be used. It is preferred to use an ultraviolet sensitizer when the onium salt and the (thia) pyrylium salt are not decomposed by the irradiation with ultraviolet light.

Typical examples of the ultraviolet sensitizer include benzoin ether compounds such as benzyl, benzoin and benzyldialkyl ketal derivatives, phenone compounds such as 2-hydroxy-2-methylpropiophenone, p-tert-butyltrichloroacetophenone and p-dimethylaminoacetophenone, benzophenone compounds such as benzophenone, 4-chlorobenzophenone, methyl-o-benzoinbenzoate and 4,4'-dialkylaminobenzophenone derivatives, thioxanthone compounds such as thioxanthone, 2-chlorothioxanthone and 2-alkylthioxanthone derivatives, and others such as 2-alkylanthraquinone derivatives. The ultraviolet sensitizer shall not be limited to the above examples, and it is preferably used to serve to decompose the onium salt with the irradiation with ultraviolet light. The above ultraviolet sensitizers may be used alone or in combination.

The curable resin composition of the present invention may be cured in the presence of a photopolymerization initiator and a dehydrating catalyst.

The visible light initiator includes combinations of the above onium salts, (thia)pyrylium salts and visible light sensitizers. The visible light sensitizer includes unsaturated ketones typified by chalcone derivatives and dibenzalacetone, 1,2-diketone derivatives typified by benzal and camphorquinone, benzoin derivatives, fluorein derivatives, naphthoquinone derivatives, anthraquinone derivatives, xanthene derivatives, thioxanthone derivatives, coumarin derivatives, ketocoumarin derivatives, cyanine derivatives, merocyanine derivatives, oxonol derivatives, acridine derivatives, azine derivatives, thiazine derivatives, oxazine derivatives, indoline derivatives, azulene derivatives, azulenium derivatives, squalylium derivatives, porphyrin derivatives, tetraphenylporphyrin derivatives, triarylamethane derivatives, tetrabenzoporphyrin derivatives, tetrapyrazino porphyrazine derivatives, tetraquinoxalyloporphyradine derivatives, naphthalocyanine derivatives, pyrylium derivatives, thiopyrylium derivatives, tetraphylline derivatives, annulery derivatives, spiropyran derivatives, spirooxazine derivatives, thiospiropuran derivatives, and organic ruthenium complexes. Specifically, further, there may be used dyestuff sensitizers described in "Dyestuff Handbook", S. Okawara, et al (1986, Kodansha Ltd.), "Chemistry of Functional Dystuffs)", S. Okawara, et al (1981, CMC), "Materials of Special Functions, T. Ikemori, et al (1986, CMC). The visible light initiator shall no be limited to the above, and it may be selected from dyestuffs and sensitizers which show absorption to light in the visible light region. These may be used alone or in combination in any amount ratio.

In the curing reaction of the curable resin composition of the present invention, a vinyl bond is formed by the reaction, and the curing reaction can be therefore proceeded with by adding a crosslinking catalyst for forming a crosslink in the vinyl bond site. The crosslinking catalyst is selected from cation polymerization initiators and radical polymerization initiators. Examples of the cation polymerization initiators include sulfuric acid, phosphoric acid, trifluoroacetic acid, and Lewis acids such as aluminum chloride, titanium tetrachloride, tin tetrachloride, iodine and boron trifluoride. Examples of the radical polymerization initiators include cumene hydroperoxide, tert-butyl hydroperoxide, dicumyl peroxide, di-tert-butyl peroxide, benzoyl peroxide, lauroyl peroxide, dibenzoyl peroxide, hydrogen peroxide, azobisisobutyronitrile, ammonium persulfate, potassium persulfate, sodium persulfate, metal peroxides, hyponitrous acid esters, and metal chelate compounds. These cation polymerization initiators may be used alone or in combination. Further, the cation polymerization initiator and the radical polymerization initiator may be used in combination.

In the production of the curable resin composition of the present invention, a polymerizable vinyl monomer, a polymer having an active double bond, an epoxy compound which undergoes ring-opening polymerization in the presence of a cationic catalyst, and a cyclic monomer such as caprolactam or caprolactone may be used in combination.

The curable resin composition of the present invention may contain a pigment, a dye, a resin, a plasticizer, an inorganic salt and a reactive monomer.

The curable resin composition or the self-crosslinkable polymer gives a cured product having a high crosslink density by means of a primary curing reaction based on a dehydrating reaction between a primary hydroxyl group and a ketone group and a secondary curing reaction based on the subsequent crosslinking of a vinyl bond formed by the dehydrating reaction. Further, the present invention also provides a curable resin composition which is prevented from undergoing the primary curing reaction based on the dehydrating reaction by adding water to the composition and which is therefore excellent in shelf life.

EXAMPLES

The present invention will be explained more in detail with reference to Examples hereinafter, while the present invention shall not be limited to these Examples.

Preparation Example 1

Synthesis of Polymer containing primary hydroxyl group (Sample A)

A 500-ml four-necked round-bottom flask having a stirrer, a nitrogen-introducing tube, a temperature sensor and a condenser was charged with dimethylformamide 100 g
4-hydroxybutyl acrylate 40 g, and
azobisisobutyronitrile (AIBN) 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 25,000.

Synthesis of polymer containing primary hydroxyl group (Sample B)

A 500-ml four-necked round-bottom flask having a stirrer, a nitrogen-introducing tube, a temperature sensor and a condenser was charged with ethyl acetate 100 g
polyethylene glycol monomethacrylate (PM-90G, supplied by Shin-Nakamura Chemical Industry Co., Ltd.) 40 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 25,000.

Synthesis of polymer containing primary hydroxyl group (Sample C)

A 500-ml four-necked round-bottom flask having a stirrer, a nitrogen-introducing tube, a temperature sensor and a condenser was charged with ethyl acetate 100 g
polyethylene glycol monomethacrylate (PM-350G, supplied by Shin-Nakamura Chemical Industry Co., Ltd.) 40 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 25,000.

Preparation Example 2

Synthesis of polymers containing ketone group

Synthesis of polymer containing ketone group (Sample D)

A 500-ml four-necked round-bottom flask having a stirrer, a nitrogen-introducing tube, a temperature sensor and a condenser was charged with ethyl acetate 100 g
methyl vinyl ketone 40 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 23,000.

Synthesis of polymer containing ketone group (Sample E)

A 500-ml four-necked round-bottom flask having a stirrer, a nitrogen-introducing tube, a temperature sensor and a condenser was charged with ethyl acetate 100 g
methyl vinyl ketone 35 g
3-methacryloyl-2-butanone 5.0 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 25,000.

Synthesis of polymer containing ketone group (Sample F)

A 500-ml four-necked round-bottom flask having a stirrer, a nitrogen-introducing tube, a temperature sensor and a condenser was charged with ethyl acetate 100 g
methoxypolyethylene glycol monomethacrylate (AM-90G, supplied by Shin-Nakamura Chemical Industry Co., Ltd.) 20 g,
methyl vinyl ketone 20 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 25,000.

Preparation Example 3

Synthesis of polymer containing primary hydroxyl group and ketone group (Sample G)

A 500-ml four-necked round-bottom flask having a stirrer, a nitrogen-introducing tube, a temperature sensor and a condenser was charged with ethyl acetate 100 g
4-hydroxybutyl acrylate 20 g
methyl vinyl ketone 20 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 57,000.

Synthesis of polymer containing primary hydroxyl group and ketone group (Sample H)

A 500-ml four-necked round-bottom flask having a stirrer, a nitrogen-introducing tube, a temperature sensor and a condenser was charged with ethyl acetate 100 g
polyethylene glycol monomethacrylate (PM-90G, supplied by Shin-Nakamura Chemical Industry Co., Ltd.) 20 g,
methyl vinyl ketone 20 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 45,000.

Synthesis of polymer containing primary hydroxyl group and ketone group (Sample I)

A 500-ml four-necked round-bottom flask having a stirrer, a nitrogen-introducing tube, a temperature sensor and a condenser was charged with ethyl acetate 100 g
polyethylene glycol monomethacrylate (PM-350G, supplied by Shin-Nakamura Chemical Industry Co., Ltd.) 10 g
methyl methacrylate 10 g
methyl vinyl ketone 20 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 55,000.

Synthesis of polymer containing primary hydroxyl group and ketone group (Sample J)

A 500-ml four-necked round-bottom flask having a stirrer, a nitrogen-introducing tube, a temperature sensor and a condenser was charged with ethyl acetate 100 g
polyethylene glycol monomethacrylate (PM-350G, supplied by Shin-Nakamura Chemical Industry Co., Ltd.) 10 g
4-hydroxybutyl acrylate 10 g
methyl methacrylate 10 g
methyl vinyl ketone 10 g
diacetoneacrylamide 10 g, and
AIBN 0.5 g and, the temperature in the flask was increased up to 74° C. in a hot water bath. The mixture was allowed to react in status quo for 4 hours. Then, 0.05 g of AIBN was added, and the mixture was stirred under heat for 2 hours. The reaction product was measured for a molecular weight (as polystyrene) by GPC to show a number average molecular weight of 53,000.

Preparation Example 4

Synthesis of polymer emulsion containing hydroxyl group (Sample K)

A 500-ml four-necked round-bottom flask having a stirrer, a nitrogen-introducing tube, a temperature sensor and a condenser was charged with 2-hydroxyethyl acrylate 5 g
styrene 20 g
methyl methacrylate 40 g polyvinyl alcohol 2 g sodium dodecylsulfate 0.5 g potassium persulfate 0.5 g, and distilled water 150 g and, while nitrogen gas was introduced, the mixture was well stirred and the temperature in the flask was increased up to 70° C. in a hot water bath. The mixture was allowed to react in status quo for 6 hours to give a milk white dispersion. The dispersion had a particle diameter of 0.1 to 3 μm. When the dispersion was allowed to stand at room temperature for 1 month, no aggregation occurred, nor was there any change in the particle diameter.

Synthesis of polymer emulsion containing ketone group (Sample L)

A 500-ml four-necked round-bottom flask having a stirrer, a nitrogen-introducing tube, a temperature sensor and a condenser was charged with diacetoneacrylamide 5 g styrene 20 g methyl methacrylate 40 g polyvinyl alcohol 2 g sodium dodecylsulfate 0.5 g potassium persulfate 0.5 g, and distilled water 150 g and, while nitrogen gas was introduced, the mixture was well stirred and the temperature in the flask was increased up to 70° C. in a hot water bath. The mixture was allowed to react in status quo for 6 hours to give a milk white dispersion. The dispersion had a particle diameter of 0.1 to 3 μm. When the dispersion was allowed to stand at room temperature for 1 month, no aggregation occurred, nor was there any change in the particle diameter.

Preparation Example 5

Synthesis of water-based polymer containing ketone group (Sample M)

A 500-ml four-necked round-bottom flask having a stirrer, a nitrogen-introducing tube, a temperature sensor and a condenser was charged with diacetoneacrylamide 20 g N-vinylpyrrolidone 80 g sodium dodecylsulfate 0.5 g potassium persulfate 0.5 g, and distilled water 150 g and, while nitrogen gas was introduced, the mixture was well stirred and the temperature in the flask was increased up to 70° C. in a hot water bath. The mixture was allowed to react in status quo for 6 hours.

Synthesis of water-based polymer containing hydroxyl group (Sample N)

A 500-ml four-necked round-bottom flask having a stirrer, a nitrogen-introducing tube, a temperature sensor and a condenser was charged with 4-hydroxybutyl acrylate 15 g N-vinylpyrrolidone 85 g sodium dodecylsulfate 0.5 g potassium persulfate 0.5 g, and distilled water 150 g and, while nitrogen gas was introduced, the mixture was well stirred and the temperature in the flask was increased up to 70° C. in a hot water bath. The mixture was allowed to react in status quo for 6 hours.

Synthesis of water-based polymer containing hydroxyl group and ketone group (Sample O)

A 500-ml four-necked round-bottom flask having a stirrer, a nitrogen-introducing tube, a temperature sensor and a condenser was charged with 4-hydroxybutyl acrylate 10 g diacetoneacrylamide 10 g N-vinylpyrrolidone 85 g sodium dodecylsulfate 0.5 g potassium persulfate 0.5 g, and distilled water 150 g and, while nitrogen gas was introduced, the mixture was well stirred and the temperature in the flask was increased up to 70° C. in a hot water bath. The mixture was allowed to react in status quo for 6 hours.

Example 1

Preparation of curable resin composition

A curable resin composition containing the following components was prepared.

Sample A 14 g

Sample D 14 g p-toluenesulfonic acid (p-TSA) 0.4 g

The above curable resin composition was applied to a glass substrate with a 1-mil applicator and air-dried at room temperature with a dryer. The applied composition on the substrate was cured in an oven at 150° C. for 30 minutes. The resultant film was insoluble in methyl ethyl ketone (MEK). The film was heated at 100° C. with a halite plate, and observed for a change with infrared spectrum to show an absorption at 1,660 cm$^{-1}$ caused by vinyl ether group, and it was found that the strength of the film increased with the passage of time.

Combinations of Samples A to F were used to carry out curing tests in the same manner as above, and Table 1 shows the results.

In Table 1, "Temperature" shows a temperature at which an applied composition was cured in an oven, and "Time" shows a time for which the applied composition was cured in the oven until it was insoluble in MEK. The amount of p-TSA was the same as the above, and the amounts of other catalysts shown in Table 1 were as described in Notes to Table 1.

Example 2

Preparation of curable resin composition

A curable resin composition containing the following components was prepared.

Sample G 15 g p-toluenesulfonic acid (p-TSA) 0.21 g

The above curable resin composition was applied to a glass substrate with a 1-mil applicator and air-dried at room temperature with a dryer. The applied composition on the substrate was cured in an oven at 150° C. for 30 minutes. The resultant film was insoluble in methyl ethyl ketone (MEK). The film was heated at 100° C. with a halite, and observed for a change with infrared spectrum to show an absorption at 1,660 cm$^{-1}$ caused by vinyl ether group, and it was found that the strength of the film increased with the passage of time.

Samples G to J were used alone or in combination to carry out curing tests in the same manner as above, and Table 2 shows the results.

The amount of p-TSA was the same as the above, and the amounts of other catalysts shown in Table 2 were as described in Notes to Table 2.

Example 3

Preparation of ultraviolet-curable resin composition

An ultraviolet-curable resin composition containing the following components was prepared.

Sample A 14 g

Sample D 14 g

Diphenyliodonium hexafluorophosphate (DIP) 0.4 g

Benzophenone (BP) 0.4 g

The above curable resin composition was applied to a glass substrate with a 1-mil applicator and air-dried at room temperature with a dryer. The curable resin composition on the substrate was irradiated with ultraviolet light with an ozoneless type ultraviolet irradiation apparatus under conditions of 80 W/cm (1 lamp) and 5 m/minute, and then the irradiated composition was post-treated at 100° C. for 30 minutes. The resultant film was insoluble in methyl ethyl ketone (MEK) and dimethylformamide (DMF). The film was heated at 150C with a halite, and observed for a change with infrared spectrum to show an absorption at 1,660 cm$^{-1}$ caused by vinyl ether group, and it was found that the strength of the film increased with the passage of time.

Samples A to F were used in combination to carry out curing tests under ultraviolet light in the same manner as above, and Table 3 shows the results.

The amounts of DIP and BP were the same as the above, and the amounts of other photopolymerization initiators shown in Table 3 were as described in Notes to Table 3.

Example 4

Preparation of visible-light-curable resin composition

A visible-light-curable resin composition containing the following components was prepared.

Sample A 14 g

Sample D 14 g

Diphenyliodonium hexafluorophosphate (DIP) 0.4 g

Di(diethylamino)ketocoumarin (dyestuff) (KC) 0.4 g

The above curable resin composition was applied to a glass substrate with a 1-mil applicator and air-dried at room temperature with a dryer. The curable resin composition on the substrate was irradiated on a spot having a diameter of 1 mm with visible light at a wavelength of 488 nm at a dose of 300 mJ/cm$^2$ with an argon laser, and then the irradiated composition was post-treated at 100° C. for 30 minutes. The resultant film was insoluble in methyl ethyl ketone (MEK) and dimethylformamide (DMF).

Samples A to F were used in combination to carry out photo-curing tests under visible light in the same manner as above, and Table 4 shows the results.

The amounts of DIP and KC were the same as the above, and the amounts of other photopolymerization initiators shown in Table 4 were as described in Notes to Table 4.

Example 5

10.0 Grams of Sample K (emulsion containing hydroxyl group) and 10.0 g of Sample L (emulsion containing ketone group) were mixed, and 0.1 g of p-toluenesulfonic acid was added. The resultant solution was applied to a glass substrate with a 1-mil applicator, heated at 80° C. for 1 hour and further heated at 150° C. for 1 hour. The resultant film was insoluble in MEK, ethyl acetate and DMF.

Example 6

10.0 Grams of Sample M (water-based polymer containing hydroxyl group) and 10.0 g of Sample N (water-based polymer containing ketone group) were mixed, and 0.1 g of p-toluenesulfonic acid was added. The resultant solution was applied to a glass substrate with a 1-mil applicator, heated at 80° C. for 1 hour and further heated at 150° C. for 1 hour. The resultant film was insoluble in MEK, ethyl acetate and DMF.

Example 7

0.1 Gram of p-toluenesulfonic acid was added to 20.0 g of Sample O (water-based copolymer containing hydroxyl group and ketone group), and the resultant solution was applied to a glass substrate with a 1-mil applicator, heated at 80° C. for 1 hour and further heated at 150° C. for 1 hour. The resultant film was insoluble in MEK, ethyl acetate and DMF.

TABLE 1

| Ex. 1 | Sample(s) | Catalyst | Temperature (°C.) | Time (minute) | Cured state |
|---|---|---|---|---|---|
| 1 | AD | p-TSA | 120 | 30 | A |
| 2 | AD | p-TSA | 100 | 30 | A |
| 3 | BD | p-TSA | 120 | 30 | A |
| 4 | CD | p-TSA | 120 | 30 | A |
| 5 | AE | p-TSA | 120 | 30 | A |
| 6 | AF | p-TSA | 120 | 30 | A |
| 7 | BD | p-TSA | 100 | 30 | A |
| 8 | BE | p-TSA | 120 | 30 | A |
| 9 | BF | p-TSA | 120 | 30 | A |
| 10 | CE | p-TSA | 120 | 30 | A |
| 11 | CF | p-TSA | 120 | 30 | A |
| 12 | ACDO | p-TSA | 150 | 90 | A |
| 13 | DPT | p-TSA | 150 | 30 | A |
| 14 | AD | p-TSA + BPO | 150 | 30 | A |
| 15 | AD | cupric sulfate | 150 | 30 | A |
| 16 | AD | ferric sulfate | 150 | 30 | A |
| 17 | AD | BF | 100 | 20 | A |
| 18 | AD | Nil | 150 | 30 | A |
| 19 | AD | Nil | 25 | 6,000 | A |

Notes:
Cured state; A: insoluble in MEK.
p-TSA; p-toluenesulfonic acid
CDO; 1,4-cyclohexadione
PT; pentaerythritol
BF: boron trifluoride/ethyl ether complex
BPO; benzoyl peroxide (5% based on resin content)
Composition of samples; sample/sample mixing ratio = 1/1 by weight
Catalyst amount; 5% based on resin content It was found that when the curable resin composition contained BPO as a radical polymerization initiator in combination with p-TSA as a catalyst, the vinyl ether group radical-reacted to proceed with the curing further.

TABLE 2

| Ex. 2 | Sample(s) | Catalyst | Temperature (°C.) | Time (minute) | Cured state |
|---|---|---|---|---|---|
| 1 | G | p-TSA | 120 | 30 | A |
| 2 | H | p-TSA | 100 | 30 | A |
| 3 | I | p-TSA | 120 | 30 | A |
| 4 | J | p-TSA | 120 | 30 | A |
| 5 | G H | p-TSA | 120 | 30 | A |
| 6 | H I | p-TSA | 100 | 30 | A |
| 7 | I J | p-TSA | 120 | 30 | A |
| 8 | G | p-TSA + BPO | 150 | 30 | A |
| 9 | G | ferric sulfate | 150 | 30 | A |
| 10 | G | BF | 100 | 20 | A |

TABLE 2-continued

| Ex. 2 | Sample(s) | Catalyst | Tempera-ture (°C.) | Time (minute) | Cured state |
|---|---|---|---|---|---|
| 11 | G J | Nil | 150 | 30 | A |
| 12 | G | p-TSA | 30 | 3,000 | A |

Notes:
Cured state; A: insoluble in MEK.
p-TSA; p-toluenesulfonic acid
BF: boron trifluoride/ethyl ether complex
BPO; benzoyl peroxide (5% based on resin content)
Composition of samples; sample/sample mixing ratio = 1/1 by weight
Catalyst amount; 5% based on resin content It was found that when the curable resin composition contained BPO as a radical polymerization initiator in combination with p-TSA as a catalyst, the vinyl bond underwent further curing by radical reaction.

TABLE 3

| Ex. 3 | Sample(s) | Photo-polymerization initiator | Number of irradia-tion times | Treatment time (minute) | Cured state |
|---|---|---|---|---|---|
| 1 | AD | DIP + BP | 1 | 30 | A |
| 2 | AD | DIP + BP | 1 | 30 | A |
| 3 | BD | DIP + BP | 2 | 30 | A |
| 4 | CD | DIP + BP | 2 | 30 | A |
| 5 | AE | DIP + BP | 1 | 30 | A |
| 6 | AF | DIP + BP | 1 | 30 | A |
| 7 | BD | DIP + BP | 2 | 30 | A |
| 8 | BE | DIP + BP | 1 | 30 | A |
| 9 | BF | DIP + BP | 2 | 30 | A |
| 10 | CE | DIP + BP | 2 | 30 | A |
| 11 | CF | DIP + BP | 2 | 30 | A |
| 12 | DPT | DIP + BP | 4 | 150 | A |
| 13 | AD | DIP + TO + BPO | 1 | 30 | A |
| 14 | AD | Nil | 1 | 30 | X |
| 15 | AD | Nil | 5 | 150 | X |
| 16 | AD | DIP + TO | 1 | 30 | A |

Notes: Cured state; A: insoluble in MEK and DMF, X: soluble in MEK and DMF
PT: pentaerythritol
BPO: benzoyl peroxide (added in an amount of 5% based on resin content)
TO: thioxanthone (added in an amount of 5% based on resin content)
Composition of samples; sample/sample mixing ratio = 1/1 by weight
Catalyst amount; 5% based on resin content It was found that when the photo-curable resin composition contained BPO as a radical initiator in combination, the vinyl ether group radical-reacted to proceed with the curing further.

TABLE 4

| Ex. 4 | Sample(s) | Photo-polymerization initiator | Irradi-ation dose (mJ) | Post-treatment time (minute) | Cured state |
|---|---|---|---|---|---|
| 1 | AD | DIP + KC | 300 | 30 | A |
| 2 | AD | DIP + KC | 300 | 30 | A |
| 3 | BD | DIP + KC | 300 | 30 | A |
| 4 | CD | DIP + KC | 250 | 30 | A |
| 5 | AE | DIP + KC | 250 | 30 | A |
| 6 | AF | DIP + KC | 300 | 30 | A |
| 7 | BD | DIP + KC | 350 | 30 | A |
| 8 | BE | DIP + KC | 250 | 30 | A |
| 9 | BF | DIP + KC | 350 | 30 | A |
| 10 | CE | DIP + KC | 350 | 30 | A |
| 11 | CF | DIP + KC | 350 | 30 | A |
| 12 | DPT | DIP + KC | 600 | 150 | A |
| 13 | AD | DIP + KC + BPO | 200 | 30 | A |
| 14 | AD | Nil | 600 | 300 | X |
| 15 | AD | Nil | 950 | 600 | X |

Notes: Cured state; A: insoluble in MEK and DMF, X: soluble in MEK and DMF
PT: pentaerythritol
BPO: benzoyl peroxide (added in an amount of 5% based on resin content)
Composition of samples; sample/sample mixing ratio = 1/1 by weight
Catalyst amount; 5% based on resin content

What is claimed is:

1. A curable resin composition comprising a compound containing a primary hydroxyl group and a compound containing a ketone group, the compound containing the ketone group being a compound in which at least one of the carbon atoms adjacent to the carbonyl carbon bonds to a hydrogen atom, provided that the compound containing a primary hydroxyl group is at least one compound selected from the group consisting of a polymer compound obtained by polymerizing a vinyl monomer containing a primary hydroxyl group, a polymer compound obtained by polymerizing a vinyl monomer containing a primary hydroxyl group and other vinyl monomer, a polymer compound of a polyhydric alcohol, a cellulose, a modified cellulose, a chitin, a monohydric low-molecular-weight compound and a polyhydric low-molecular-weight compound, and the compound containing the ketone group is at least one compound selected from the group consisting of (1) a polymer compound obtained by polymerizing a vinyl monomer containing a ketone group, (2) a polymer compound obtained by polymerizing a vinyl monomer containing a ketone group and other vinyl monomer, (3) a graft-polymer compound obtained by graft-polymerizing a resin and a vinyl monomer containing a ketone group said resin being at least one resin selected from the group consisting of a polyester resin, a polyamide resin, a polyimide resin, a polyether resin, a polyurethane resin, a polyethylene resin, a polycarbonate resin and a polysulfone resin, and (4) a graft-polymer compound obtained by graft-polymerizing a vinyl monomer containing a ketone group and other vinyl monomer.

2. A composition according to claim 1, wherein the vinyl monomer containing a primary hydroxyl group is at least one selected from the group consisting of acrylate monomers containing a primary hydroxyl group, acrylamide monomers containing a primary hydroxyl group and olefin monomers containing a primary hydroxyl group.

3. A composition according to claim 1, wherein the compound containing a ketone group is a polymer compound in which the ketone group contains 2 adjacent carbon atoms in a main chain and/or a side chain of the compound, provided that at least one of the two carbon atoms adjacent to the ketone group has a hydrogen atom.

4. A composition according to claim 3, wherein the polymer compound has a weight average molecular weight of at least 500.

5. A composition according to claim 1, wherein the vinyl monomer containing a ketone group is at least one selected from the group consisting of vinyl alkyl ketones, acetoacetoxy alkyl (meth)acrylate, diacetoneacrylamide and benzalacetone.

6. A composition according to claim 1, wherein the compound containing a ketone group is a polymer compound obtained by graft-polymerizing at least one resin selected from the group consisting of a polyester resin, a polyamide resin, a polyimide resin, a polyether resin, a polyurethane resin, a polyethylene resin, a polycarbonate resin and a polysulfone resin and a vinyl monomer containing a ketone group or by graft-polymerizing a vinyl monomer containing a ketone group and other vinyl monomer.

7. A composition according to claim 1, wherein the vinyl monomer containing a ketone group is at least one selected from the group consisting of vinyl alkyl ketones, acetoacetoxy alkyl (meth)acrylate, diacetoneacrylamide and banzalacetone.

8. A composition according to claim 1, wherein the composition is present in an aqueous medium.

9. A composition according to claim 1, wherein the composition further contains a dehydrating agent.

10. A composition according to claim 1, wherein the composition further contains a photopolymerization initiator.

11. A composition according to claim 1, wherein the composition further contains a crosslinking catalyst for forming a crosslink in a vinyl bond site.

12. A self-crosslinkable polymer obtained by copolymerizing a vinyl monomer containing a primary hydroxyl group and a vinyl monomer containing a ketone group, the vinyl monomer containing the ketone group being a monomer in which at least one of the carbon atoms adjacent to the carbonyl carbon bonds to a hydrogen atom.

13. A polymer according to claim 12, wherein the polymer is a polymer obtained by copolymerizing the vinyl monomer containing a primary hydroxyl group and the vinyl monomer containing a ketone group in an amount ratio of 1 to 99 mol of the vinyl monomer containing a primary hydroxyl group and 99 to 1 mol of the vinyl monomer containing a ketone group.

14. A polymer according to claim 12, wherein the self-crosslinkable is a polymer obtained by copolymerizing the vinyl monomer containing a primary hydroxyl group, the vinyl monomer containing a ketone group and others vinyl monomer.

15. A polymer according to claim 13, wherein the vinyl monomer containing a primary hydroxyl group is at least one selected from the group consisting of acrylate monomers containing a primary hydroxyl group, acrylamide monomers containing a primary hydroxyl group and olefin monomers containing a primary hydroxyl group.

16. A polymer according to claim 12, wherein the vinyl monomer containing a ketone group is at least one selected from the group consisting of vinyl alkyl ketones, acetoacetoxy alkyl (meth)acrylate, diacetoneacrylamide and benzalacetone.

17. A polymer according to claim 12, wherein the polymer further contains a dehydrating agent.

18. A polymer according to claim 12, wherein the polymer further contains a photopolymerization initiator.

19. A polymer according to claim 12, wherein the polymer further contains a crosslinking catalyst for forming a crosslink in a vinyl bond site.

20. A polymer according to claim 12, wherein the polymer is present in an aqueous medium.

* * * * *

UNITED STATES PATENT AND TRADEMARK OFFICE
CERTIFICATE OF CORRECTION

PATENT NO. : 5,900,462
DATED : May 4, 1999
INVENTOR(S) : Hozumi TANAKA

It is certified that error appears in the above-identified patent and that said Letters Patent is hereby corrected as shown below:

Column 17 lines 10 and 11, the term "banzalacetone" should read --benzalacetone--.

Column 18, line 7, the term "others" should read --other--.

Signed and Sealed this

Sixth Day of June, 2000

*Attest:*

Q. TODD DICKINSON

*Attesting Officer*      *Director of Patents and Trademarks*